United States Patent
Xie et al.

(10) Patent No.: US 12,553,888 B2
(45) Date of Patent: Feb. 17, 2026

(54) FABRICATION OF FLUORESCENT NANOPARTICLES AND THEIR CONJUGATES FOR IN VITRO AND IN VIVO DIAGNOSTICS

(71) Applicant: AUISET BIOTECHNOLOGY CO. LTD., Hong Kong (CN)

(72) Inventors: Ni Xie, Hong Kong (CN); Benzhong Tang, Hong Kong (CN)

(73) Assignee: AUISET BIOTECHNOLOGY CO. LTD., Hong Kong (CN)

(*) Notice: Subject to any disclaimer, the term of this patent is extended or adjusted under 35 U.S.C. 154(b) by 904 days.

(21) Appl. No.: 17/624,571

(22) PCT Filed: Jul. 17, 2020

(86) PCT No.: PCT/CN2020/102815
§ 371 (c)(1),
(2) Date: Jan. 3, 2022

(87) PCT Pub. No.: WO2021/017904
PCT Pub. Date: Feb. 4, 2021

(65) Prior Publication Data
US 2022/0268764 A1    Aug. 25, 2022

Related U.S. Application Data

(60) Provisional application No. 62/881,125, filed on Jul. 31, 2019.

(51) Int. Cl.
*G01N 33/533* (2006.01)
*B01L 3/00* (2006.01)
(Continued)

(52) U.S. Cl.
CPC .......... *G01N 33/533* (2013.01); *B01L 3/5023* (2013.01); *C09B 57/00* (2013.01);
(Continued)

(58) Field of Classification Search
CPC .. B01L 2300/069; B01L 3/5023; B82Y 15/00; C07D 207/448; C09B 23/145;
(Continued)

(56) References Cited

U.S. PATENT DOCUMENTS

| | | | |
|---|---|---|---|
| 2008/0160306 A1* | 7/2008 | Mushtaq | C09K 11/883 427/215 |
| 2011/0135734 A1* | 6/2011 | Magdassi | B01J 13/00 977/906 |

(Continued)

FOREIGN PATENT DOCUMENTS

| | | |
|---|---|---|
| CN | 1394882 A | 2/2003 |
| CN | 1643379 A | 7/2005 |
| WO | 2015/018322 A1 | 2/2015 |

OTHER PUBLICATIONS

Oct. 21, 2020 PCT International Search Report, International Application No. PCT/CN2020/102815.

(Continued)

*Primary Examiner* — Jennifer Wecker
*Assistant Examiner* — Jonathan Bortoli
(74) *Attorney, Agent, or Firm* — Law Offices of Albert Wai-Kit Chan, PLLC

(57) ABSTRACT

Provided are fluorescent nanoparticles and their conjugates and methods of using the same for in vivo and in vitro diagnostics and other applications. In some embodiments, provided are fluorescent nanoparticles with high solid-state absolute quantum yield. In some embodiments, provided are methods of manufacturing such nanoparticles. Nanoparticles may comprise monomers, such as styrene, and fluorophores, such as AIEgen™ Bright Green.

18 Claims, 7 Drawing Sheets

(51) Int. Cl.
  *B82Y 15/00*  (2011.01)
  *C09B 57/00*  (2006.01)
  *C09B 67/02*  (2006.01)
  *G01N 33/52*  (2006.01)

(52) U.S. Cl.
  CPC ....... *C09B 67/0097* (2013.01); *G01N 33/521* (2013.01); *B01L 2300/069* (2013.01); *B82Y 15/00* (2013.01)

(58) Field of Classification Search
  CPC ... C09B 23/148; C09B 57/00; C09B 67/0096; C09B 67/0097; G01N 33/521; G01N 33/533
  See application file for complete search history.

(56) References Cited

U.S. PATENT DOCUMENTS

| | | | |
|---|---|---|---|
| 2013/0149381 A1* | 6/2013 | Lopez Campos | A61K 9/5123 977/773 |
| 2014/0234983 A1* | 8/2014 | Zaderenko Partida | G01N 21/6428 436/171 |
| 2015/0203751 A1* | 7/2015 | Bawendi | C09K 11/885 252/301.6 S |

OTHER PUBLICATIONS

Oct. 21, 2020 PCT Written Opinion, International Application No. PCT/CN2020/102815.

Yang, Tianshe et. al., "Polymer nanoparticles with an embedded phosphorescent osmium(II) complex for cell imaging", Journal of Materials Chemistry, vol. 21, Feb. 11, 2011 (Feb. 11, 2011), pp. 5360-5367.

Fukui, Chiaki et. al., "Fluorescent p-conjugated polymer nanoparticles: A new synthetic approach based on nanoagglomeration via polyion association", Materials Research Society, vol. 30, No. 1, Jan. 14, 2015 (Jan. 14, 2015), pp. 10-18.

Hill, Samantha et. al., "Silicon quantum dot-poly(methyl methacrylate) nanocomposites with reduced light scattering for luminescent solar concentrators", ACS. Photonics, Dec. 4, 2018 (Dec. 4, 2018), pp. 1-29.

Shevchenko, N. N. et. al., "Luminophore-Containing Polymer Particles:Synthesis and Optical Properties of Thin Films on Their Basis", Nanotechnologies in Russia, vol. 7, No. 3-4, Dec. 31, 2012 (Dec. 31, 2012), pp. 188-195.

Shimizu, Masaki et.al., "Use of silylmethoxy groups as inducers of efficient room temperature phosphorescence from precious-metal-free organic luminophores", Materials Chemistry Frontiers, vol. 00, No. 1-3, Dec. 14, 2017 (Dec. 14, 2017), pp. 1-8.

Ponomarenko, Sergei A. et. al., "Nanostructured organosilicon luminophores and their application in highly efficient plastic scintillators", Scientific Reports, Oct. 8, 2014 (Oct. 8, 2014), pp. 1-8.

Han, Fangfang et. al., "A new TICT and AIE-active tetraphenylethenebased Schiff base with reversible piezofluorochromism", Royal Society of Chemistry, vol. 6, Jul. 13, 2016 (Jul. 13, 2016), pp. 68178-68184.

* cited by examiner

- ① 25 mm NC membrane
- ② 17 mm Absorbent pad
- ③ 5 mm Conjugate pad
- ④ 20 mm Sample pad
- ⑤ 35.5 mm T line to bottom
- ⑥ 40.5 mm C line to bottom

FABRICATION OF FLUORESCENT NANOPARTICLES AND THEIR CONJUGATES FOR IN VITRO AND IN VIVO DIAGNOSTICS

TECHNICAL FIELD

The present invention relates to polymer nanoparticles that can be fabricated using multiple methods to serve as reporters for in vitro and in vivo diagnostics.

BACKGROUND ART

Nanomaterials can be functionalized with biorecognition molecules to create specific molecular diagnostic probes. Recent developments in nanotechnology have put forward a wide range of nanosensing platforms with unique properties to increase the detection capabilities, sensitivity, ease of operation, and portability of the biodetection assemblies that are revolutionizing diagnostics in healthcare. This novel nanodiagnostic approach could further develop point-of-care diagnostics and monitoring technologies.

Immunolabeling is a well-established technique for the detection and localization of target antigens (e.g. proteins). This technique has been widely used in different fields such as molecular biology, biochemistry and in-vitro diagnostic industry. There are two methods, direct and indirect, for immunolabeling technique. In direct method, the target antigen is detected by the primary antibody conjugated with a fluorescent tag or an enzyme, whereas in indirect method, the target antigen is firstly recognized by the primary antibody and then detected by the tagged secondary antibody specially binds to the primary antibody. Both the direct and indirect methods can be applied in immunoblotting, immunohistochemistry, immunofluorescence, enzyme-linked immunosorbent assay (ELISA) and Fluorescence-activated cell sorting (FACS). Conventionally, the direct method can minimize the species cross-reactivity potentially caused by the secondary antibody. The sensitive of direct immunolabeling, however, is far lower than indirect method because the primary antibody can be bound with several tagged secondary antibodies resulting in signal amplification.

The working principle of lateral flow assays (LFAs) is largely similar to ELISA. The LFAs have been widely used in hospitals and clinical laboratories, as well as in veterinary medicine, in environmental assessment, and for safety testing during food production. Such assays are affordable, sensitive, specific, user-friendly, rapid and robust. Upon addition of samples such as urine and blood, the results can be obtained within a few minutes without additional equipment or with minimal amounts of equipment.

Signal labels are key to lateral flow assays. These particles or molecules have a color or another property enabling detection and are coupled to binding/detection molecules. Gold nanoparticles have been widely used in lateral flow assays. These particles are characterized by ease of preparation and functionalization, good biocompatibility, and cost effectiveness. Gold nanoparticles produce a colored readout which does not require any equipment for visualization.[1] However, this method is usually qualitative or semi-quantitative, has low signal intensity and poor sensitivity.

The search for novel labels with better analytical performance is an ongoing challenge. Although fluorescent labels have been reported that can facilitate sensitive and quantitative detection of trace analytes, most of them have luminescence quantum efficiency that is too low to be applied in the lateral flow assays. In addition, the current fluorescence lateral flow assays have a narrow detection range ($10^0$-$10^2$) under given condition of mass per volume, normally (ng/mL or mg/mL) or with the (mIU/mL).[1]

Furthermore, fluorescent intensity quenching effect is a common drawback of fluorescent materials.[2] Therefore, it is highly desirable to find a material that exhibits non-quenching fluorescence and can be encapsulated into nanoparticles or nanoclusters. Signal labels that do not exhibit fluorescence intensity quenching effect can effectively improve detection sensitivity and enable quantitative analysis while still retaining the advantages of simplicity, rapidness, and portability of a common lateral flow immunoassay.

One of the most promising fluorescent labels is quantum dots (QDs). They have diverse and unique physicochemical characteristics including high quantum yields, tunable emission wavelength and strong photostability. However, the drawbacks of QDs include high toxicity, harshness, complicated synthesis procedures, and colloidal instability. CdSe (Cadmium Selenide) based quantum dots are highly toxic and require a stable polymer shell. In addition, the mass production of over one kilogram of the protein functionalized QDs is difficult to achieve at the present stage of technology.[3] Although they have been proven to exhibit good fluorescence properties upon fabrication into nanoparticles, they suffer from emission quenching effect at higher concentration and in the solid state. Further, based on previous results, quantum dots have a very narrow detection range.[4-6]

Upconverting phosphor is a class of rare-earth containing crystal particles capable of up-converting photons of lower energy infrared light into higher energy visible light. However, these materials have low luminescence quantum yield. Lanthanide labels, such as Eu, emit in the red region and the absolute quantum yield efficiency is in general below 40%.[7]

Aggregation-induced emission (AIE) materials can also serve as reporters.[8]

Fluorescent nanoparticles reported here have distinct properties such as luminescence quantum yield of no less than 20%, tunable emission color and uniform size distribution. More importantly, mass production of the fluorescent nanoparticles is relatively easy and inexpensive. In appropriate combinations, functionalized nanoparticle probes can be utilized in quantitative single and multiplexed assays in a compact point-of-care platform. AIE nanoparticles can also replace the conventional tags for antibody conjugation in immunolabeling. The AIE conjugated antibodies can solve the problem on the low sensitivity of the direct immunolabeling method, and can further enhance the sensitivity on the indirect immunolabeling method.

Thus, our reported nanoparticles can be applied, for example, in early disease detection, genomic technologies, in vivo diagnosis, and in personalized and predictive medicine.

Technical Solution

In some embodiments, this invention provides unique fluorescent nanoparticles and the functionalized nanoparticles which show a high solid-state absolute quantum yield no less than 20%. In some embodiments, the emission wavelength of the fluorescence core may be UV light (200-420 nm), visible light (420-780 nm) or infra-red (780-1200). Suitable emission wavelength may be selected for different diagnostic purposes. In some embodiments, antibody conjugates of fluorescent nanoparticles are unexpectedly stable in open environment even after half a year. In some embodiments, the detection range is from $10^9$-$10^4$ (mIU/mL) which is two orders of magnitude wider than the conventional products.

Fabrication of Fluorescent Particles

The fluorophores may be mixed with monomers which then undergo polymerization or may be directly encapsulated by macromolecules. These methods allow to maintain high fluorescence quantum yield in an aggregation state, a cluster or high concentration state. For example, the fluorophores can be mixed with the monomer, such as, for example, styrene, methyl methacrylate (MMA), and acrylic acid, which is then polymerized. The fluorescent nanoparticles can also be fabricated via other methods, such as microfluidic and ultrasonic methods, with or without involving chemical reactions. For example, fluorescent nanoparticles can be fabricated using a typical microfluidic flow-focusing device involving chemical reactions (FIG. 1).

Unique Properties of Fluorescent Particles

The fluorescent particles reported in this invention may have a wide range of sizes. The diameter of the fluorescent particles of the present invention may be in the range of several millimeters ($10^{-3}$ m) (milliparticles), to micrometers ($10^{-6}$ m) (microparticles), to nanometers ($10^{-9}$ m) (nanoparticles) with a good homogeneity in terms of size, shape, and surface properties. Most of the time, we refer to fluorescent nanoparticles, however, it is understood that milliparticles and microparticles with suitable characteristics may also be used.

It is well known that the proper size of nanoparticles and good homogeneity are important in biomedical applications. The size of nanoparticles needs to be optimized to allow their functionalities to be tailored for different biomedical applications, since chemical and physical properties of nanoparticles are dependent on size. In addition, nanoparticles should have narrow size distribution in order to avoid any discrepancies in detection. For example, the size of the nanoparticles applied in the lateral flow immunoassay should be as small as possible. Binding molecules and antibodies generally have dimensions of 5-15 nm and, because of their small size, are released from a conjugate pad much easier than the complex conjugates of binding molecules immobilized on the surface of nanoparticles. Compared with existing fluorophores, the nanoparticles reported in this invention have large stokes shift (>50 nm), which allows the background fluorescence to be removed easily by an optical filter. In addition, the fluorescent particles of the present invention do not suffer from quenching effect at a higher concentration or in aggregation state.[8]

Functionalization of Nanoparticles for Different Diagnostic Purposes

Further functionalization of the nanoparticles with a sensing molecule is necessary in order to use the unique physical properties of nanoparticles for different diagnostic purposes. The molecule may be a small molecule (for example, biotin), an aptamer, a peptide with a large affinity for the analyte, or a biomacromolecule, such as RNA, DNA, or a protein (for example, an antibody, or an enzyme). Functionalization of the nanoparticles with sensing molecules has been achieved by (i) electrostatic interaction, (ii) chemisorption (e.g., by thiol or amine groups), (iii) covalent binding, and (iv) affinity-based systems. For example, using crosslinkers such as 1-ethyl-3-(3-dimethyl aminopropyl)-carbodiimide (EDC) or EDC/N-hydroxysuccinimide (NHS), the molecules, such as antibodies or other proteins, can be covalently bound to nanoparticles.

One kind of fluorescent nanoparticles is fabricated with a core-shell structure which has a hydrophilic surface with functional groups for bio-modification (for example, carboxyl groups, amine groups, thiol groups, etc.). For example, proteins, such as antibodies, may be attached to nanoparticles by linking the functional groups attached to the surface of nanoparticles with N-terminal or C-terminal amino acids of said proteins. Fluorescent nanoparticles linked to antibodies may be used in immunoassays. FIG. 2 depicts a schematic representation of one embodiment of a fluorescent nanoparticle. One of skill in the art may select proteins and other sensing molecules based on their particular needs.

MODE FOR INVENTION

Applications of Fluorescent Nanoparticle Conjugates

The fluorescent nanoparticle conjugates could be used for Western blot (WB) as indirect or direct indicators, for immunohistochemistry (IHC), for immunocytochemistry/immunofluorescence (ICC/IF), for flow cytometry (FC), for lateral flow assays (LFA).

In some embodiments, our invention can effectively improve detection sensitivity of lateral flow assays and enable quantitative analysis. Such assays can be applied, example, for healthcare monitoring, medical diagnosis in emergencies and resource-poor settings, food quality control in case of foodborne disease, and water monitoring for harmful ion pollution.

Figure 3:
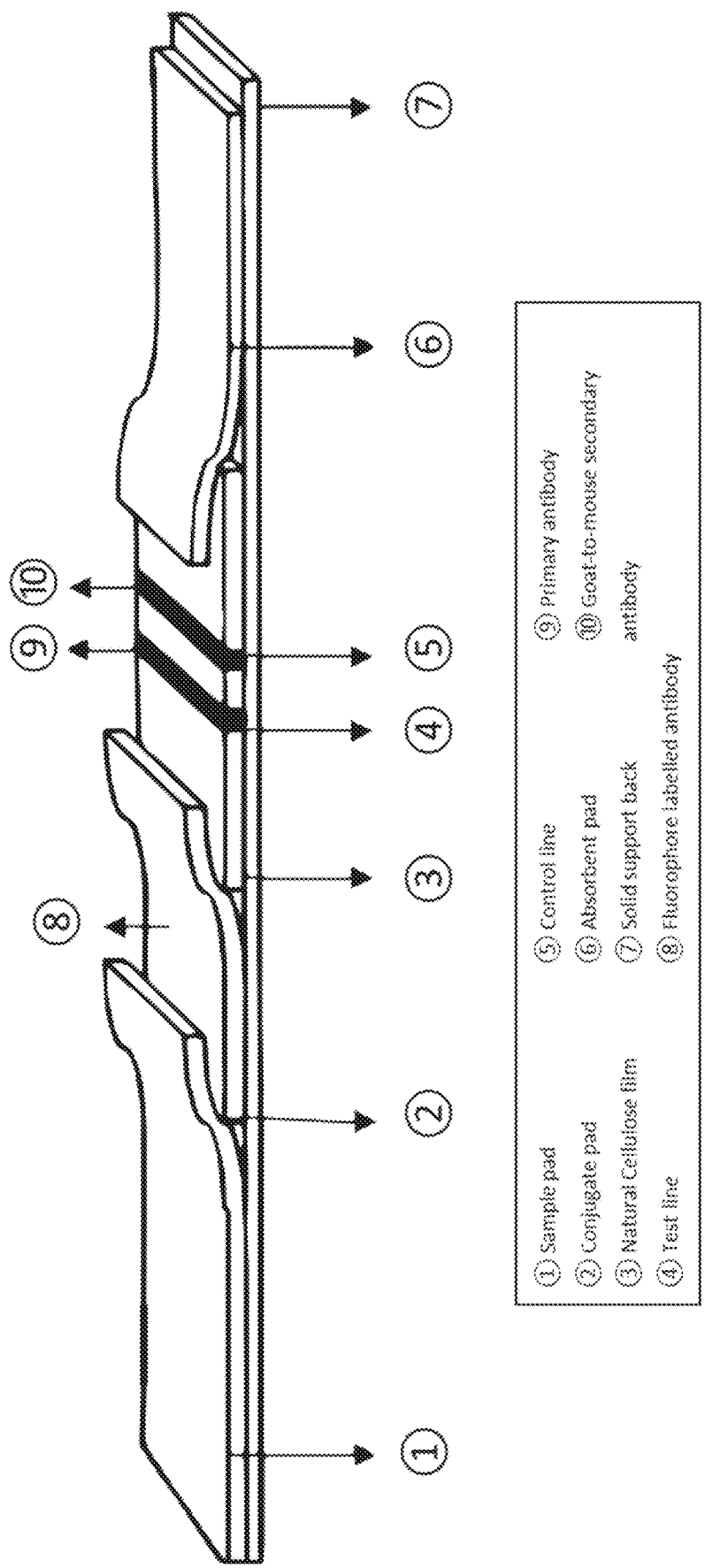
FIG. 3. Illustrates a side view of a lateral flow strip representing some embodiments of the present invention.
Figure 4:
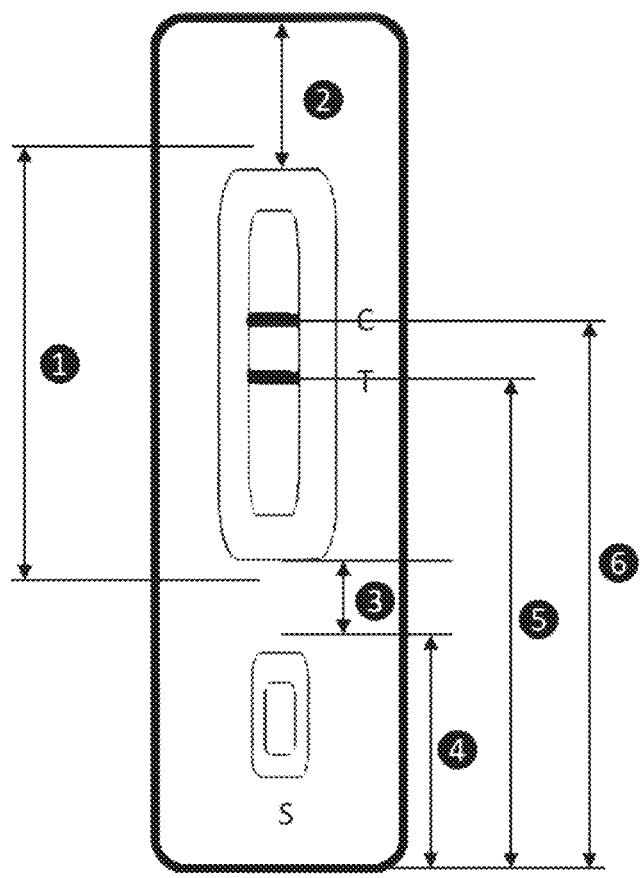
FIG. 4. Illustrates a top view of a lateral flow strip representing some embodiments of the present invention.

One embodiment of the invention is a one-step lateral flow assay that includes sample pad, a conjugate pad, a reaction membrane (for example, a nitrocellulose membrane (NC)), an adsorbent pad, and at least one kind of fluorescent conjugate that does not exhibit emission quenching at higher concentration dispensed on the conjugate pad. All these components are mounted over a backing card. In some embodiments of the invention, a solid support matrix may be used instead of the backing card. FIGS. 3 and 4 depict some embodiments of the lateral flow assays.

One embodiment consists of overlapping membranes mounted on a backing card or a solid support matrix in the following order: a sample pad, a conjugate pad, a reaction membrane and an adsorbent pad. The conjugate pad is composed of at least one kind of fluorescent nanoparticle conjugates specific to the target analyte(s), which do not exhibit emission quenching at higher concentration. A sample is applied to the sample pad and then moves along the membrane by capillary force reaching the conjugate pad containing the fluorescent nanoparticles conjugated with biorecognition molecules. The sample then reaches the reaction membrane containing test line(s) and control line(s) for target analyte(s) and, finally, the adsorbent pad, which reserves waste. Different capture molecules could be immobilized on the test line(s) or control line (s) of the strip depending on the nature of the target analyte(s). For example, the test line(s) and control line(s) include primary and secondary antibodies for sandwich format of the antibody based lateral flow assays, respectively. The primary antibody specifically binds to the second antigenic site of target analyte(s), while the secondary antibody specifically binds to the labeled antibody(s).

This invention can be applied in lateral flow immunoassay for detection of antigens, such as human chorionic gonadotropin (hCG) and luteinizing hormone (LH). Body fluids, such as blood, serum, urea, saliva, nasal fluid and tears may be applied on the sample pad and will migrate through the conjugate pad, which contains fluorescent antibody conjugates that are specific to the target analyte. The sample, together with the antibody conjugate(s) bound to the target analyte(s) moves along the strip into the detection zone of the NC membrane with specific antibodies immobilized in lines to react with the analyte(s) bound to the conjugated antibody (sandwich assays). Recognition of the sample analyte(s) results in an appropriate response on the test line, while a response on the control line indicates the proper liquid flow through the strip. The read-out, represented by the lines appearing with different intensities, can be assessed using a dedicated analyzer. The intensity of the test line is used to determine the quantity of analyte(s) in the sample.

Various analyzers may be used with different embodiments of the present invention depending on the purpose. For example, in some embodiments, a complementary metal-oxide-semiconductor (CMOS) or a charge-couple device (CCD) may be used to record the fluorescence image onto a color matrix value of (x, y, z) where x is for red, y for green, z for blue. The image is then processed with image processing algorithm which determines analyte concentration based on the fluorescence intensities of the test and control line(s) and the ratio of their intensities. In some embodiments, fluorescence signals are collected and converted into electronic signals by a photoelectric converter, such as a photodiode. For both approaches, the analyzer should include: (i) excitation light source, such as light-emitting diode (LED); (ii) electronic power bank or power drive to keep the LED light on during the capture the of fluorescence signals by CMOS/photodiodes; (iii) transmit module for data transmission to a smart platform such like smart phone or personal computer; (iv) memory for data storage; (v) printed circuit board fully integrated with all components; (vi) optionally, optical fiber/optical waveguide glass/filter.

Figure 5:
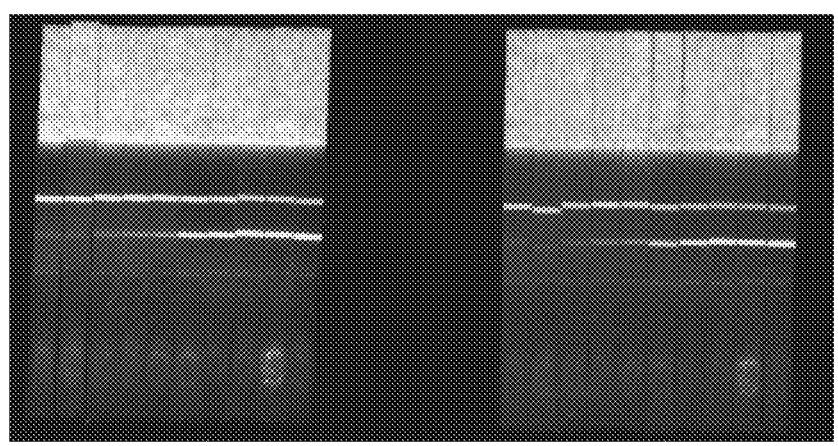
FIG. 5. Depicts a photograph of the hCG test strips at different concentrations of 0, 2, 5, 5, 10, 25, 100, 200, 500, 1000, 10000 mIU/mL which was taken on the first day (left panel) and after six months (right panel) of the test under light excitation at 365 nm using the same camera setting.

In some embodiments, the present invention has a broad detection range for a variety of detectable proteins. For example, for hCG, the detection range may be from $10^0$ to $10^4$ mIU/mL. For LH, the detection range may be from $10^0$ to $10^3$ mIU/mL. In some embodiments, the fluorescence bands on the used membranes can be observed without obvious degradation after half a year (FIG. 5), indicating that the fluorescent antibody conjugates have excellent photostability which make it possible to keep the test records for long time.

In some embodiments, a luminogen that does not exhibit quenching at higher concentration or aggregation state may be used in place of a fluorophore.

The nanoparticles may be cross-linked to biodetection molecules by a "click" reaction between azide and alkyne groups or by reaction of thiol with bromide with a metal-free catalyst. Other suitable cross-linking methods may be used.

In some embodiments, the analyzer used is capable of detecting electroluminescence, mechanoluminescence, triboluminescence, chemiluminescence, piezoluminescence, and mechanochromic, etc.

In some embodiments, luminophores may comprise a fluorogen. In some embodiments, fluorogen may have the following backbone structure:

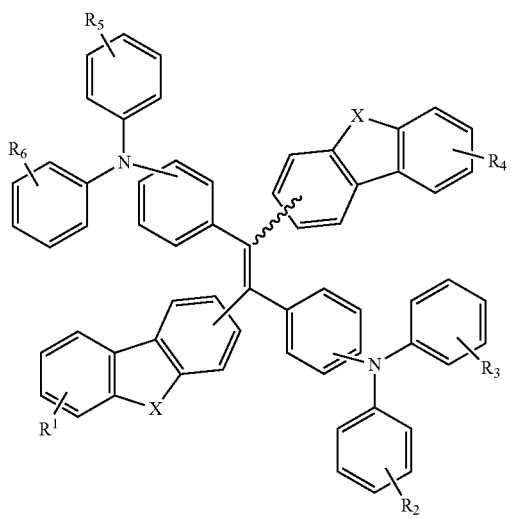

where each of $R_1$, $R_2$, $R_3$, $R_4$, $R_5$, and $R_6$ is independently selected from the group consisting of H, alkyl, unsaturated alkyl, heteroalkyl, cycloalkyl, heterocycloalkyl, aryl, and heteroaryl; and where each X is independently selected from O, S, Se, Te, C, Si, Ge, P, As and Sb, wherein X may be further substituted with H, alkyl, unsaturated alkyl, heteroalkyl, cycloalkyl, heterocycloalkyl, aryl, or heteroaryl. Someone skilled in the art would understand that depending on the valence of X, it may carry 0-3 substituents. For example, if a group 4 element is selected for X (such as Si), it may be bound to two protons, or to two other substituents (such as alkyl, unsaturated alkyl, heteroalkyl, cycloalkyl, heterocycloalkyl, aryl, and heteroaryl), or to a proton and another substituent.

In some embodiments, a nanoparticle with luminescence quantum yield higher than 20% comprises luminophores entangled in a mesh of polymer, wherein the amount of luminophores in said mesh of polymer may be any within the range of 1-50 w/w %.

Procedure for Fabrication of Fluorescence Nanoparticle via Polymerization

In some embodiments of the present invention, fluorescent nanoparticles may be prepared according to the procedure below.

Preferably, before the polymerization reaction, all the monomers should be purified, for example, through an aluminium oxide ($Al_2O_3$) column, and oxygen should be removed from deionized (DI) water, for example, by bubbling with nitrogen for 30 minutes.

A set up including a two-neck flask, a mechanical stirring device and an oil bath is assembled. The two-neck flask is submerged into oil bath. The two-neck flask should not be shaken when the mechanical stirring is working. Then, 0.01-0.2 g sodium dodecylbenzenesulfonate (SDBS), 0.05-0.5 g ammonium bicarbonate ($NH_4HCO_3$) and 5-20 mL DI water is added into the two-neck flask. The mechanical stirrer is turned on with a speed of 100-1000 rpm and the oil bath temperature is raised to 60-80° C.

The initiator aqueous solution is prepared by dissolving 0.01-0.1 g of ammonium persulfate [$(NH_4)_2S_2O_8$] in DI water.

The monomer mixture is prepared by dissolving 4,4'-(1, 2-bis(dibenzo [b,d]thiophen-2-yl) ethene-1,2-diyl)-bis(N,N-diphenylaniline) (commercial name AIEgen™ Bright Green, previously known as NSTPE) in 0.1-900 mL [styrene (St)/methyl methacrylate (MMA)/acrylic acid (AA) (v/v 1:0.02-1:0.02-1)].

When the reaction mixture becomes transparent, 3-5% volume of prepared monomer mixture is added to the reaction mixture for pre-emulsification. In some embodiments, 1 to <100% volume of prepared monomer mixture may be added to the reaction mixture for pre-emulsification. After 10-60 minutes, the initiator aqueous solution and remaining monomer mixture are added simultaneously into the flask with a speed of 2-10 drops over several minutes. It is noteworthy that the addition of initiator should preferably be completed slightly later than that of monomer mixture. The reaction mixture is kept heating at 70-90° C. until it turns milky white. The crude product is then purified after the reaction mixture cools down.

In some embodiments, surfactant used to prepare reaction mixture may be one or more of the following: sodium decylbenzenefulfonate, sodium dodecyl sulfate, docusate sodium, perfluorooctanesulfonic acid, perfluorobutanesulfonic acid, sodium stearate, quaternary ammonium cation

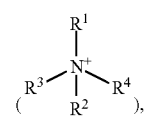

where the R groups may be one or more of alkyl or aryl groups [e.g. benzalkonium chloride

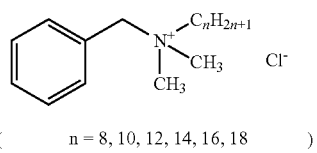

( n = 8, 10, 12, 14, 16, 18 )

and distearyldimethylammonium chloride], alkyl polyglycoside

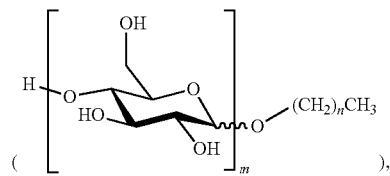

where m may vary from 1 to 100, [e.g. decyl glucoside], glycerol monostearate, nonyl phenoxypolyethoxylethanol

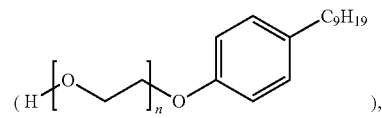

where n may vary from 1 to 100, etc.

In some embodiments, to achieve the small size and good uniformity of the nanoparticle, a fluorophore that is completely soluble in the monomer solution is used. As shown in Table 1, the solubility of fluorophore in monomer solution decreases from Entry 1 to Entry 3. No polymerization occurs if the fluorophore is insoluble in the monomer solutions (Entry 3). Although polymerization occurs when the fluorophore is partially soluble in the monomer solutions (Entry 2), the small size and good uniformity of the nanoparticle cannot be achieved. Only when the fluorophore completely soluble in the monomer solution, the nanoparticles have very small size (<50 nm) and good uniformity.

TABLE 1

Solubility of some fluorophores in some monomers.

| Entry | Fluorophore | Solubility of fluorophore in monomer (e.g. styrene, acrylic acid or methyl methacrylate) | Size after emulsion polymerization |
| --- | --- | --- | --- |
| 1 | NSTPE<br>Also known as AIEgen™ Bright Green | Good in which the mixture is completely transparent | 50 nm with PDI 0.02 |
| 2 | TTAPE | Partially soluble in whch the mixture is semi-transparent | 250 nm with PDI 1.2 |
| 3 | TPE | Poor in which the mixture is turbid | Failed to form polymer reaction. |

Procedure for Fabrication of Fluorescence Nanoparticle Using a Microfluidic Device.

Figure 1:
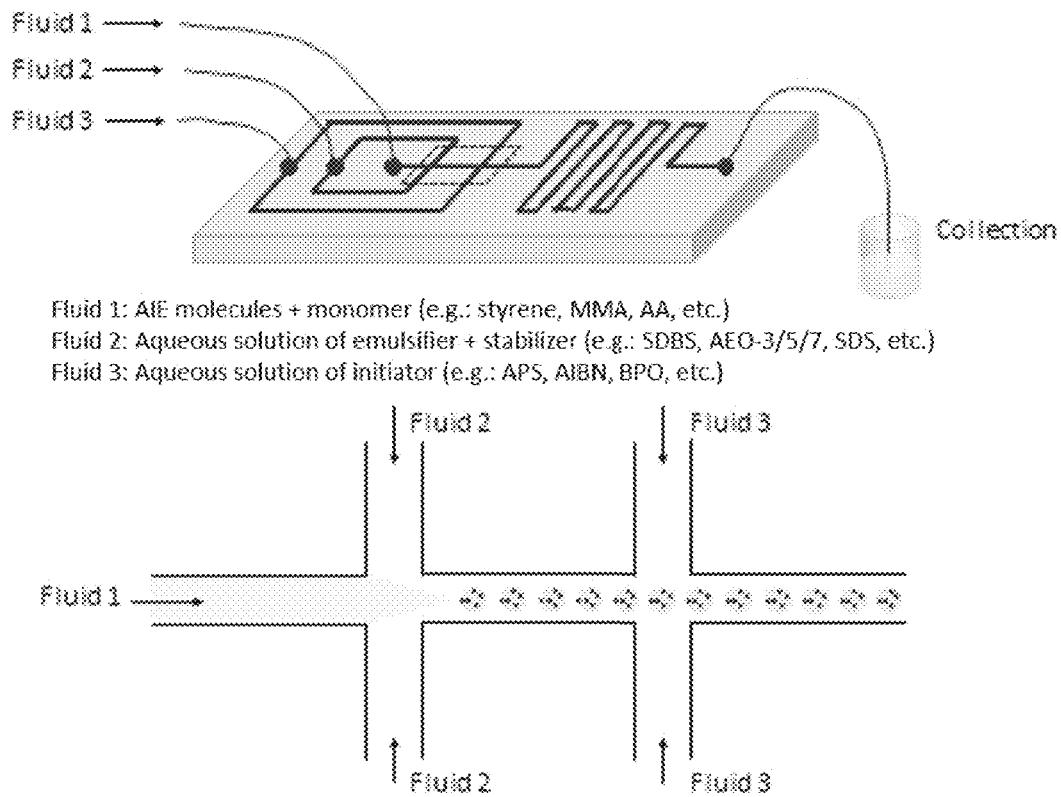
FIG. 1. Illustrates an embodiment of a microfluidic device for the fabrication of the fluorescent nanoparticles. The following abbreviations are used: Methyl methacrylate (MMA)-acrylic acid (AA), sodium dodecylbenzene-sulfonate (SDBS), alcohol ethoxylates (AEO, with the repeating unit of 3/5/7), sodium dodecyl sulfate (SDS). ammonium persulphate (APS), 2,2'-azobis(isobutyronitrile) (AIBN), benzoyl peroxide (BPO).
Figure 2:
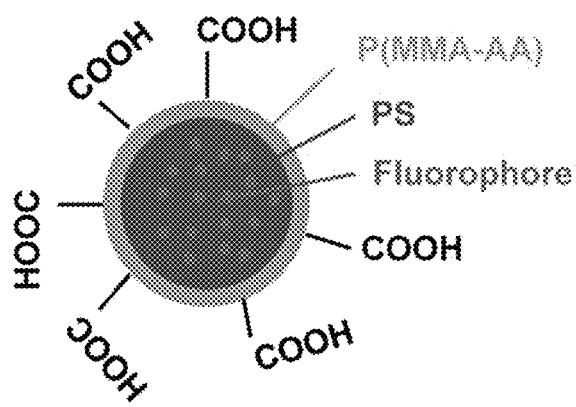
FIG. 2. Illustrates a nanoparticle with a core-shell structure with attached functional groups for bio-modification.

In some embodiments, a typical microfluidic flow-focusing device may be used for fabrication of fluorescence nanoparticles (FIG. 1). The microfluidic devices can be fabricated from poly(dimethyl-siloxane) (PDMS) using a standard micro-molding method. Alternatively, all microchannels with specific dimensions can be etched in silicon wafers using deep reactive ion etching or wet etching method. Then the etched silicon wafer can be bonded with a glass substrate using anodic bonding. Heaters (platinum) can be fabricated on the glass substrate to provide heat for the microchannels. Temperature sensors (e.g. platinum sensor) can be fabricated on the glass substrate to record the temperature inside the microchannels. The particle size of fluorescence nanoparticles can be tuned by changing the flow parameters.

Procedure for Purification of Fluorescent Nanoparticles

In some embodiments of the invention, nanoparticles may be purified according to the following procedure.

The crude product is centrifuged at 5-15 k rpm for 3-30 minutes to remove the free AIEgen™ Bright Green. The upper layer is transferred to a tube and ethanol is added with a volume ratio of 1:0.1-10 for demulsification. Obvious precipitates can be observed after several hours. Then the mixture is centrifuged at 5-15 k rpm for 3-30 minutes to get the solid product. After that, the isolated product is redispersed in 1× phosphate-buffered saline (PBS) with the assistance of ultrasonic machine. The final solution is stored at room temperature for further use.

Procedure for Labelling Reaction

In some embodiments, labeling reactions may be performed as described below.

146 µL 2-ethanesulfonic acid (MES) buffer (pH 6.0), 50 µL nanoparticle (particles size <200 nm) solution, 2 µL 1-ethyl-3-(3-dimethylaminopropyl)carbodiimide hydrochloride (EDC) solution (20 mg/mL), and 2 µL N-hydroxysulfosuccinimide (sulfo-NHS) solution (55 mg/mL) were added into a 1.5 mL tube. The EDC and sulfo-NHS solutions was prepared with MES buffer (pH 6.0) before use. After the reaction mixture was shaken with 100-1000 rpm (Eppendorf Centrifuge 5424R) at room temperature for 15-60 minutes, 1.4 µL 2-mercaptoethanol was added in the tube to inactivate the EDC. Then, the reaction mixture was centrifuged under 5-15 k rpm for 3-30 minutes. The solid product was collected and washed with 200 µL MES buffer several times.

The purified solid product was redispersed in 600 µL 1×PBS buffer (pH 7.4) to prepare the activated fluorescent nanoparticle solution. 200 µL activated fluorescent nanoparticle solution and 200 µL antibodies were transferred to a 1.5 mL tube. The reaction mixture was kept shaking with 100-1000 rpm at room temperature for 1-4 hours. Afterwards, it was centrifuged at 0-4° C. and 5-15 k rpm for 1-60 minutes and the solid product was collected. The solid product was redispersed in 200 µL 1% bovine serum albumin (BSA) solution (in 1×PBS buffer) and the mixture was shaken with 100-1000 rpm at 0-4° C. After 1-24 hours, the mixture was centrifuged at 0-4° C. and 5-15 k rpm for 3-30 minutes and the solid product was collected. The solid product was redispersed in 200 µL TBS-T buffer (Tween-20 0.05%) with the assistance of ultrasonic machine to yield the nanoparticle antibody conjugates. The solution of labelled nanoparticles was stored under 4-8° C. for further use.

Procedure for Preparation of Lateral Flow Test Strip

In some embodiments of the present invention, the lateral flow test strip may be prepared according to the procedure described below.

(i) Preparation of the Conjugate Pad:

Conjugate solution is produced by diluting the labelled nanoparticles with TBS-T buffer (pH 7.4) containing 0.1-1 mol/L sodium chloride (NaCl), 1-20 mmol/L ethylenediamine-tetraacetic acid (EDTA), 1-10% (w/v) BSA, 1-10% (w/v) sucrose, and 0.01-0.1% (w/v) sodium azide ($NaN_3$) to a final concentration of 1-100 µg/mL. 5-25 µL conjugate solution is added to a conjugate pad with the size of 3×6 mm which is then dried for 3 hours at 37° C.

(ii) Immobilization of Capture Reagents:

0.1-2 mg/mL mouse-anti-human alpha-LH-mAB for LH test strip (or mouse-anti-human alpha-hCG-mAB for hCG test strip) and 0.1-2 mg/mL goat-anti-mouse IgG (For both LH and hCG detection) are individually applied on the nitrocellulose membrane as the test and control lines, respectively. The test and control lines are both set at 5 mm apart from the center of the membrane. The membrane applied with these reagents in the form of dots at 9 $\mu L^{-1}$ $cm^{-1}$ and is dried for 1-2 hours at 37° C. At last, the membrane is blocked by using 0.1-5% (w/v) BSA and is then dried and stored in sealed condition.

(iii) Preparation of Sample and Absorbent Pads:

Sample and absorbent pads are made of nonwoven, 100% pure cellulose fiber (Millipore). The 15×300 mm sample pad is saturated with the pH 8.0 buffer containing 0.5-5.0% (w/v) BSA, 0.5-5.0% (w/v) sucrose, 2-20 mmol/L sodium borate, and 0.01-0.1% (w/v) $NaN_3$, and is then dried for storing. The absorbent pad was cut to size of 40×300 mm.

(iv) Assembly of the Lateral Flow Test Strip:

The sample pad, conjugate pad, NC membrane, and absorbent pad are assembled on the plastic backing support board sequentially with a 1-2 mm mover lap and covered by color film at both ends. The master card is cut to 3 mm width strips using a CM4000 Cutter (Bio-Dot). The test strips are then sealed in a plastic bag in the form of desiccant gel and stored at 4° C.

EXAMPLES

Example 1. Fabrication of Fluorescence Nanoparticles

Table 2 summarizes a range of chemicals and reaction conditions for the polymerization. Table 3 lists the nanoparticle parameter measured by dynamic light scattering (DLS) machine.

A set up including a two-neck flask, a mechanical stirring device and an oil bath was assembled. The two-neck flask which was submerged into oil bath should not be shaken when the mechanical stirring is working. Then, 0.2 g SDBS, 0.5 g $NH_4HCO_3$ and 20 mL DI water were added into the two-neck flask. The mechanical stirrer was turned on with a speed of 1000 rpm and the oil bath temperature was raised to 60° C.

Then add 0.2 g SDBS, 0.5 g $NH_4HCO_3$ and 20 mL DI water into the flask, turn on the mechanical stirrer with a speed of 1000 rpm, and elevate the oil bath temperature to 60° C. Alternatively, cell disrupter (SCIENTZ-95E) was used instead of the mechanical stirrer at 600 W for 3 minutes (designated P5 in Table 3).

The initiator aqueous solution was prepared by dissolving 0.01 g of ammonium persulfate [$(NH_4)_2S_2O_8$] in 1 mL DI water. The monomer mixture was prepared by dissolving 0.001 g AIEgen™ Bright Green in 0.1 mL St/MMA/AA (v/v) with the following volume ratios: 1:0.1:0.1 (designated P2 in Table 3); 1:1:1 (designated P3 in Table 3); 1:0.02:0.18 (designated P4 in Table 3); 1:0.1:0.1 (designated P5 in Table 3). After heating the mixture for 5 minutes at 60° C., the fluorophore was completely soluble in the monomer solution and the solution became transparent. Then, 3% of volume of the prepared monomer mixture was added to the reaction mixture for pre-emulsification. After 10 minutes, the initiator aqueous solution and the remaining monomer mixture were added simultaneously into two-neck reaction flask with a speed of 10 drops per minute. It is noteworthy that the addition of initiator was completed slightly later than that of monomer mixture. The reaction mixture was kept heating at 70° C. until it turned milky white. The crude product was then purified after the reaction mixture cooled down.

Example 2. Fabrication of Fluorescent Nanoparticles

The fabrication of nanoparticles P6, P7 and P8 was performed according to the same procedure as P2-P4 except that the pure monomer solution was used as follows: P6: only styrene; P7: only MMA; P8: only AA. The particle size was 80 nm with PDI 0.035 for P6, 98 nm with PDI 0.05 for P7, 103 nm with PDI 0.045 for P8.

TABLE 2

Chemicals and reaction conditions for polymerization reactions.

| Chemical and Reaction Conditions | Range |
|---|---|
| St/MMA/AA (mL) | 1:0.02-1:0.02-1 |
| $(NH_4)_2S_2O_8$ (g, in 2 mL DI water) | 0.01-0.1 |
| SDBS (g) | 0.01-0.2 |
| $NH_4HCO_3$ (g) | 0.05-0.5 |
| DI water (mL) | 5-20 |
| AIEgen™ Bright Green (mg) | 1-100 |
| Mechanical stirring speed (rpm) | 100-1000 |
| Temperature (° C.) | 70-90 |
| Time (h) | 1-4 |

Example 3. Fabrication of Fluorescence Nanoparticles

Table 4 summarizes a range of chemicals and reaction conditions for the polymerization. Table 3 lists the nanoparticle parameter measured by dynamic light scattering (DLS) machine. 0.1 g SDBS, 0.5 g $NH_4HCO_3$ and 15 mL DI water were added into a two-neck flask. The flask was placed in an oil bath and the oil bath temperature was elevated to 70° C. to dissolve the solids. The flask was removed and the reaction mixture was cooled down. The initiator aqueous solution was prepared by dissolving 0.02 g of ammonium persulfate [$(NH_4)_2S_2O_8$] in 1 mL DI water. The monomer mixture was prepared by dissolving 0.01 g AIEgen™ Red in 0.6 mL St/MMA/AA (v/v) with volume ratio of 1:0.1:0.1 (designated P9 in Table 3). The prepared monomer mixture was added to the reaction mixture for pre-emulsification by a cell disruptor (SCIENTZ-95E) at 500 W for 0.5 h. A set up including the two-neck flask, a mechanical stirring device and the oil bath was assembled. The two-neck flask was submerged into the 70° C. oil bath with 300 rpm of mechanical stirring. The set up should not be shaken when the mechanical stirring is working. After 10 minutes, the initiator aqueous solution was added to the two-neck reaction flask with a speed of 5 drops per minute. After that, the reaction mixture was kept heating at 70° C. for further 1 h. The crude product was then purified after the reaction mixture cooled down.

Example 3. Purification of Fluorescent Nanoparticles

Figure 6:
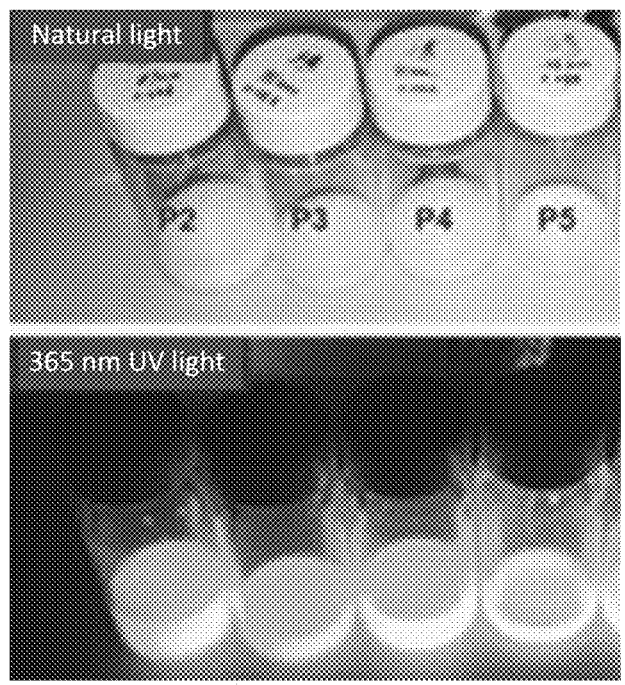
FIG. 6. Photoluminescence of fluorescent nanoparticles prepared as described in example 1 under natural light and 365 nm UV excitation.

The crude product obtained from Example 1 was centrifuged at 3 k rcf for 3 minutes to remove the free AIEgen™ Bright Green. The upper layer was transferred to a tube and ethanol was added with a volume ratio of 1:0.1 for demulsification. Obvious precipitates can be observed after several hours. Then the mixture was centrifuged at 5 k rpm for 3 minutes to get the solid product. After that, the isolated product was re-dispersed in 1× phosphate-buffered saline (PBS) with the assistance of ultrasonic machine (Guanboshi GS1530P-30L-900 W) at 900 w for 1 minute. The final solution was stored at room temperature for further use. FIG. 6 shows the photoluminescence of the fluorescence nanoparticles under natural light and with 365 nm UV excitation.

TABLE 3

Particle size for selected examples

| Entry | St/MMA/AA (mL) | DLS [z average (nm), PDI] | |
|---|---|---|---|
| | | Crude product | Purified product |
| P2 | 1:0.1:0.1 | 82, 0.076 | 87, 0.046 |
| P3 | 1:1:1 | 135, 0.19 | 156, 0.09 |
| P4 | 1:0.02:0.18 | 91, 0.20 | 91, 0.042 |
| P5[a] | 1:0.1:0.1 | 84, 0.132 | 106, 0.098 |
| P9 | 1:0.1:0.1 | 145, 0.179 | 135, 0.056 |

[a]Ultrasonic pre-emulsification for 10 minutes

TABLE 4

Chemicals and reaction conditions for polymerization reactions.

| Chemical and Reaction Conditions | Range |
|---|---|
| St/MMA/AA (mL) | 1:0.02-1:0.02-1 |
| $(NH_4)_2S_2O_8$ (g, in 2 mL DI water) | 0.01-0.1 |
| SDBS (g) | 0.01-0.2 |
| $NH_4HCO_3$ (g) | 0.05-0.5 |
| DI water (mL) | 1-1000 |
| AIEgen™ Red (g) | 0.001-1000 |
| Mechanical stirring speed (rpm) | 10-2000 |
| Temperature (° C.) | 70-90 |
| Time (h) | 1-4 |
| Pre-emulsification power | 10-1000W |
| Pre-emulsification time (h) | 0.01-30 |

TABLE 5

Reaction formula of selected examples for the antibody labelling

| Entry | EDC (20 mg/mL) | NHS (55 mg/mL) | Fluorescent NPs | MES buffer (pH = 6.0) | Antibody (200 μL) |
|---|---|---|---|---|---|
| NL10 | 2 μL | 2 μL | 50 μL (P2) | 146 μL | β-hCG-mAb (10 mg/mL) |
| LH3 | 2 μL | 2 μL | 50 μL (P2) | 146 μL | β-LH-mAb (1 mg/mL) |

Example 4. Purification of Fluorescent Nanoparticles

Figure 8:
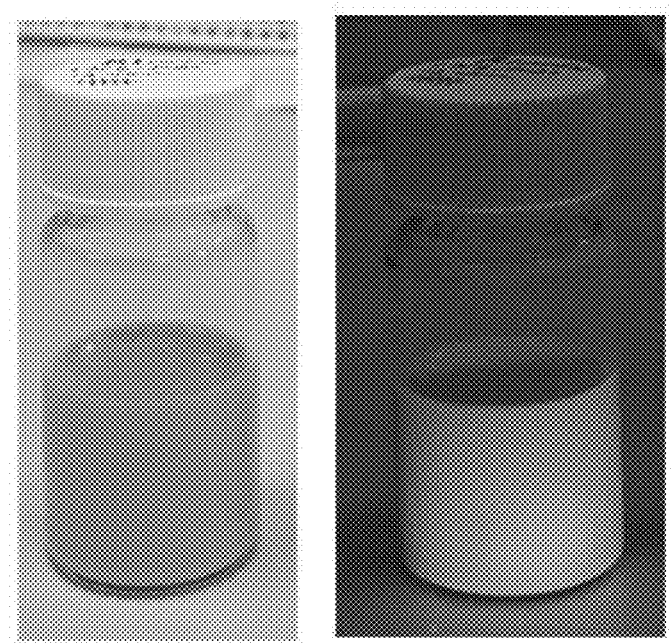
FIG. 8. Photo of AIEgen™ Red containing fluorescence nanoparticles under natural light (left) and with 365 nm UV excitation (right).

The crude product obtained from Example 1 was centrifuged at 3 k rcf for 3 minutes to remove the free AIEgen™ Bright Green. The upper layer was transferred to a tube and ethanol was added with a volume ratio of 1:0.1 for demulsification. Obvious precipitates can be observed after several hours. Then the mixture was centrifuged at 5 k rpm for 3 minutes to get the solid product. After that, the isolated product was re-dispersed in 1× phosphate-buffered saline (PBS) with the assistance of ultrasonic machine (Guanboshi GS1530P-30L-900 W) at 900 w for 1 minute. The final solution was stored at room temperature for further use. FIG. 8 shows the photoluminescence of the fluorescence nanoparticles under natural light and with 365 nm UV excitation.

Example 5. Purification of Fluorescent Nanoparticles

The crude product obtained from Example 3 was centrifuged at 3 k rcf for 10 minutes twice to remove the free AIEgen™ Red. The upper layer was transferred to a tube and ethanol was added with a volume ratio of 1:4 (crude product:EtOH, v/v) for demulsification. Then the mixture was centrifuged at 6600 rcf for 50 minutes to get the solid product. The solid product was re-dispersed in DDI water with brief ultrasonic treatment. After centrifuging at 21 k rcf for 30 min, the solid product obtained was re-dispersed again in DDI water. After centrifuging at 21 k rcf for 30 min again, the purified product was re-dispersed in 0.1M 2-(N-Morpholino)ethanesulfonic acid (MES, pH 6.0) with the assistance of ultrasonic machine (Guanboshi GS1530P-30L-900 W) at 900 w for 20 minute. The final dispersion was stored at room temperature or at 4° C. refrigerator for further use. FIG. 8 shows the photoluminescence of the fluorescence nanoparticles under natural light and with 365 nm UV excitation.

Example 6. Procedure for Labelling Reaction of NL10 and LH3

146 μL 2-ethanesulfonic acid (MES) buffer (pH 6.0), 50 μL nanoparticle of P2 solution, 2 μL 1-ethyl-3-(3-dimethylaminopropyl)carbodiimide hydrochloride (EDC) solution (20 mg/mL), and 2 μL N-hydroxysulfosuccinimide (sulfo-NHS) solution (55 mg/mL) were added into a 1.5 mL tube. The EDC and sulfo-NHS solutions was prepared with MES buffer (pH 6.0) before use. After the reaction mixture was shaken with 300 rpm (Eppendorf Centrifuge 5424R) at room temperature for 15 minutes, 1.4 μL 2-mercaptoethanol was added in the tube to inactivate the EDC. Then, the reaction mixture was centrifuged under 5 k rpm for 5 minutes. The solid product was collected and washed with 200 μL IVIES buffer several times. Table 5 lists selected examples of the antibody labelling.

The purified solid product was redispersed in 600 μL, 1×PBS buffer (pH 7.4) to prepare the activated fluorescent nanoparticle solution. 200 μL of activated fluorescent nanoparticle solution and 200 μL of antibodies (NL10 with β-hCG-mAb or LH3 with β-LH-mAb as indicated in Table 5) were transferred to a 1.5 mL tube. The reaction mixture was kept shaking with 150 rpm at room temperature for 3 hours. Afterwards, it was centrifuged at 0° C. and 6 k rpm for 8 minutes and the solid product was collected. The solid product was redispersed in 200 μL 1% bovine serum albumin (BSA) solution (in 1×PBS buffer) and the mixture was shaken with 240 rpm at 0-4° C. After 3 hours, the mixture was centrifuged at 0-4° C. and 6 k rpm for 4 minutes and the solid product was collected. The solid product was redispersed in 200 μL TBS-T buffer (Tween-20 0.05%) with the assistance of ultrasonic machine to yield the nanoparticle antibody conjugates. The solution of labelled nanoparticles was stored under 8° C. for further use.

Example 7. Preparation of Lateral Flow Test Strip

Preparation of Conjugate Pad:

Conjugate solution was produced by diluting the labelled nanoparticles with TBS-T buffer (pH 7.4) containing 0.1 mol/L NaCl, 20 mmol/L EDTA, 1% (w/v) BSA, 1% (w/v) sucrose, and 0.02% (w/v) NaN$_3$ to a final concentration of 50 μg/mL. 20 μL conjugate solution was added to a conjugate pad with the size of 3×6 mm which was then dried for 3 hours at 37° C.

(ii) Immobilization of Capture Reagents:

0.1 mg/mL mouse-anti-human alpha-LH-mAB for LH test strip (or mouse-anti-human alpha-hCG-mAB for hCG test strip) and 0.5 mg/mL goat-anti-mouse IgG (For both LH and hCG detection) were individually applied on the nitrocellulose membrane as the test and control lines, respectively. The test and control lines were both set at 5 mm apart from the center of the membrane. The membrane applied with these reagents in the form of dots at 9 μL$^{-1}$ cm$^{-1}$ and was dried for 1 hours at 37° C. At last, the membrane was blocked by using 5% (w/v) BSA and was then dried and stored in sealed condition.

(iii) Preparation of Sample and Absorbent Pads:

Sample and absorbent pads were made of nonwoven, 100% pure cellulose fiber (Millipore). The 15×300 mm sample pad was saturated with the pH 8.0 buffer containing 0.5% (w/v) BSA, 0.5% (w/v) sucrose, 2 mmol/L sodium borate, and 0.01% (w/v) NaN$_3$, and was then dried for storing. The absorbent pad was cut to size of 40×300 mm.

(iv) Assembly of the Lateral Flow Test Strip:

The sample pad, conjugate pad, NC membrane, and absorbent pad were assembled on the plastic backing support board sequentially with a 2 mm mover lap and covered by color film at both ends. The master card was cut to 3 mm width strips using a CM4000 Cutter (Bio-Dot). The test strips were then sealed in a plastic bag in the form of desiccant gel and stored at 4° C.

Example 8. Procedure for the Detection of Protein Standard Solution

Figure 7:
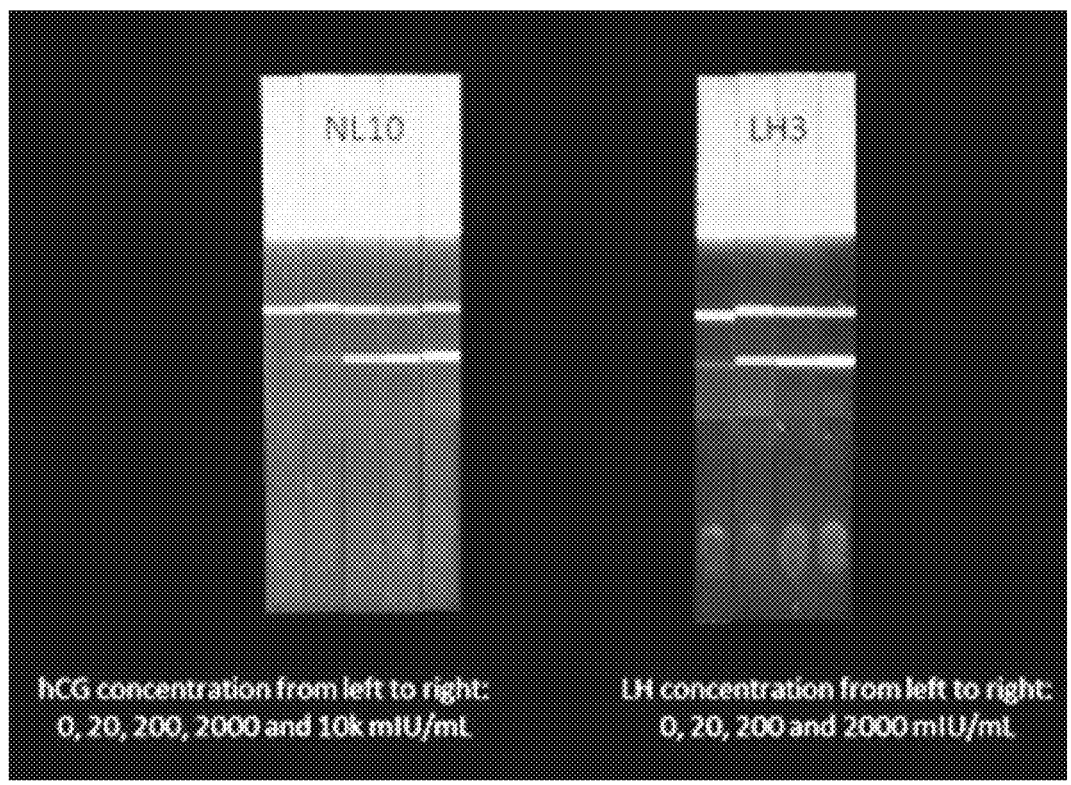
FIG. 7. Photograph of the hCG (left) and LH test strips (right) at different concentrations of hCG at 0, 20, 200, 2000, 10000 mIU/mL and LH at 0, 20, 200, 2000 mIU/mL with the sample volume at 100 microliters under 365 nm UV excitation.

Example 5 was used for the testing. Different concentration of LH standard solutions ranging from 0 to 200 mIU/mL were prepared by dilution in TBS-T buffer (pH 7.4). 100 μL of sample was loaded onto the sample pad of the test strip, and then inserted into the analyzer, which was a photodiode machine, after 10-60 minutes. All experiments were performed in triplicate, and the average of the triplicates was used for the analysis. The detection of the hCG standard solution ranging from 0 to 10 k mIU/mL is similar. FIG. 7 shows hCG and LH test strips at different concentrations under 365 nm UV excitation.

Example 9. Procedure for Labelling Reaction of α-hCG-mAb

130 μL 2-ethanesulfonic acid (MES) buffer (pH 7.0), 60 μL nanoparticle of P2 solution, 1-4 μL, 1-ethyl-3-(3-dimethylaminopropyl)carbodiimide hydrochloride (EDC) solution (15-25 mg/mL), and 1 μL N-hydroxysulfosuccinimide (sulfo-NHS) solution (50 mg/mL) were added into a 1.5 mL tube. The EDC and sulfo-NHS solutions was prepared with MES buffer (pH 6.0) before use. After the reaction mixture was shaken with 200 rpm (Eppendorf Centrifuge 5424R) at room temperature for 10 minutes, 1 μL 2-mercaptoethanol was added in the tube to inactivate the EDC. Then, the reaction mixture was centrifuged under 5 k rpm for 5 minutes. The solid product was collected and washed with 2 μL MES buffer several times. The purified solid product was redispersed in 1000 μL 1×PBS buffer to prepare the activated fluorescent nanoparticle solution. 200 μL of activated fluorescent nanoparticle solution and 700 μL of antibodies (α-hCG-mAB) were transferred to a 1.5 mL tube. The reaction mixture was kept shaking with 150 rpm at room temperature for 3 hours. Afterwards, it was centrifuged with 6 k rpm for 5 minutes and the solid product was collected. The solid product was redispersed in 700 μL 2% bovine serum albumin (BSA) solution (in 1×PBS buffer) and the mixture was shaken with 200 rpm at 0° C. After 3 hours, the mixture was centrifuged at 6 k rpm for 3 minutes and the solid product was collected. The solid product was redispersed in 200 μL TBS-T buffer (Tween-20 0.05%) with the assistance of ultrasonic machine to yield the nanoparticle antibody conjugates. The solution of labelled nanoparticles was stored under 4° C. for further use.

Example 10. Preparation of Lateral Flow Test Strip for Simultaneous Detection of Two Proteins Preparation of conjugate pad: Conjugate solution was produced by diluting the labelled nanoparticles with TBS-T buffer containing 0.1 mol/L NaCl, 20 mmol/L EDTA, 1% (w/v) BSA, 1% (w/v) sucrose, and 0.02% (w/v) $NaN_3$ to a final concentration of 50 μg/mL. 20 μL conjugate solution was added to a conjugate pad with the size of 3×6 mm which was then dried for 3 hours at 37° C. (ii) Immobilization of capture reagents: 0.1 mg/mL mouse-anti-human alpha-LH-mAB for LH detection, mouse-anti-human beta-hCG-mAB for hCG detection and 0.5 mg/mL goat-anti-mouse IgG (For both LH and hCG detection) were individually applied on the nitrocellulose membrane as the test line 1, test line 2 and control line, respectively. The test and control lines were both set at 4 mm apart from the center of the membrane. The membrane applied with these reagents in the form of dots at 9 μL-1 cm-1 and was dried for 1 hours at 37° C. At last, the membrane was blocked by using 5% (w/v) BSA and was then dried and stored in sealed condition. (iii) Preparation of sample and absorbent pads: Sample and absorbent pads were made of nonwoven, 100% pure cellulose fiber (Millipore). The 15×300 mm sample pad was saturated with the pH 8.0 buffer containing 0.5% (w/v) BSA, 0.5% (w/v) sucrose, 2 mmol/L sodium borate, and 0.01% (w/v) $NaN_3$, and was then dried for storing. The absorbent pad was cut to size of 40×300 mm. (iv) Assembly of the lateral flow test strip: The sample pad, conjugate pad, NC membrane, and absorbent pad were assembled on the plastic backing support board sequentially with a 2 mm mover lap and covered by color film at both ends. The master card was cut to 3 mm width strips using a CM4000 Cutter (Bio-Dot). The test strips were then sealed in a plastic bag in the form of desiccant gel and stored at 4° C.

Figure 9:
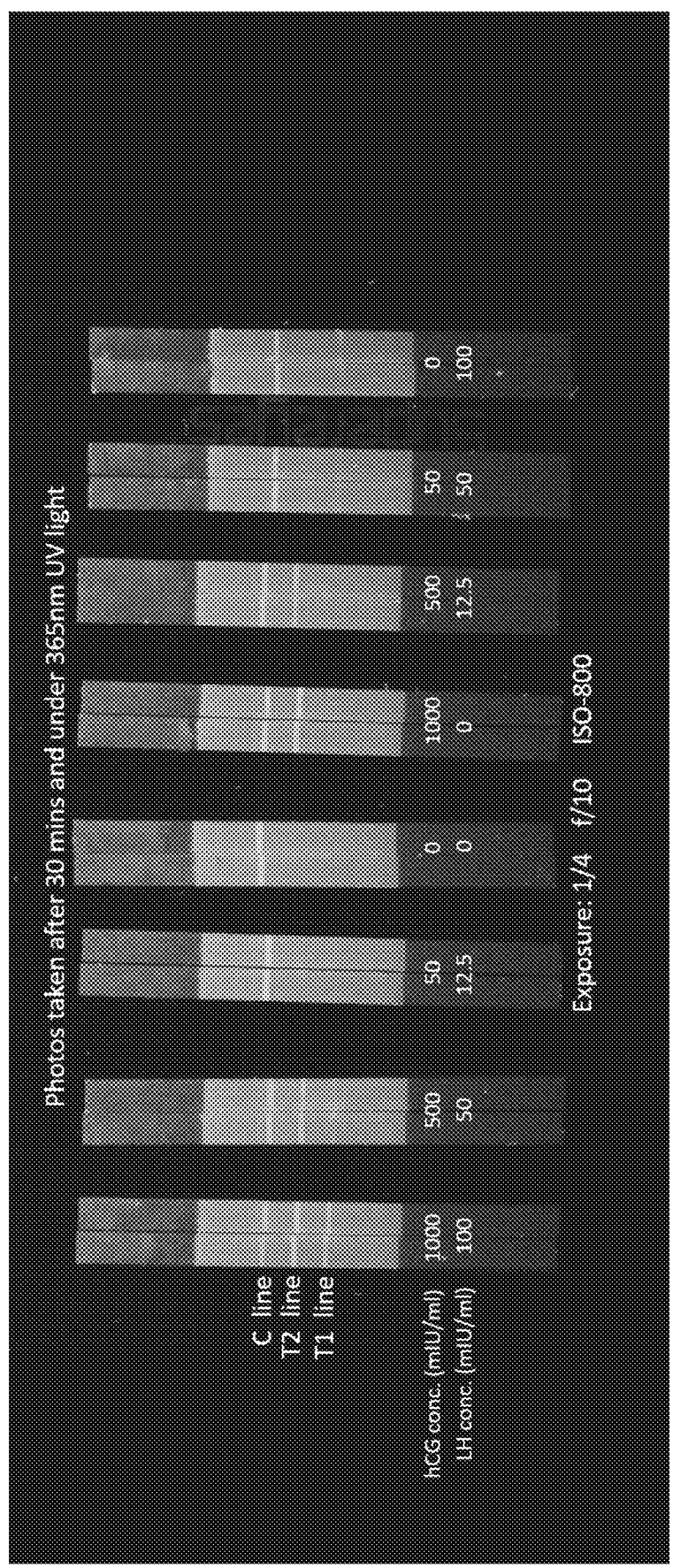
FIG. 9. Photo of the paper strip with two test lines under the 365 nm excitation, where T1 and T2 for LH and hCG detections, respectively.

Example 11. Procedure for the Simultaneous Detection of Two Protein Standard Solution Example 8 was used for the testing. Different combination of concentration of LH and hCG standard solutions ranging from 0 to 100 mIU/mL and from 0 to 1000 mIU/ml respectively were prepared by dilution in PBS buffer (pH 7.4). 100 μL of sample was loaded onto the sample pad of the test strip, and then inserted into the analyzer, which was a photodiode machine, after 10-60 minutes. All experiments were performed in duplicate, and the average of the duplicates was used for the analysis. FIG. 9 shows test strips at different concentrations of proteins under 365 nm UV excitation.

Example 12. Procedure for Labelling Reaction of COVID-19 Nucleocapsid Protein

130 μL 2-ethanesulfonic acid (MES) buffer (pH 6.0), 50 μL nanoparticle of P2 solution, 1-4 μL, 1-ethyl-3-(3-dimethyl aminopropyl)carbodiimide hydrochloride (EDC) solution (15-25 mg/mL), and 1 μL N-hydroxysulfosuccinimide (sulfo-NHS) solution (50-60 mg/mL) were added into a 1.5 mL tube. The EDC and sulfo-NHS solutions was prepared with MES buffer (pH 6.0) before use. After the reaction mixture was shaken with 200 rpm (Eppendorf Centrifuge 5424R) at room temperature for 10 minutes, 1 μL 2-mercaptoethanol was added in the tube to inactivate the EDC. Then, the reaction mixture was centrifuged under 5 k rpm for 5 minutes. The solid product was collected and washed with 200 μL MES buffer several times. The purified solid product was redispersed in 500-1000 μL 1×PBS buffer (pH 7.4) to prepare the activated fluorescent nanoparticle solution. 200-700 μL of activated fluorescent nanoparticle solution and 200-700 μL of protein (2019-nCov nucleocapsid protein) were transferred to a 1.5 mL tube. The reaction mixture was kept shaking with 150-300 rpm at room temperature for 1-3 hours. Afterwards, it was centrifuged at 6-8 k rpm for 5-10 minutes and the solid product was collected. The solid product was redispersed in 200-700 μL 0.5-2% bovine serum albumin (BSA) solution (in 1×PBS buffer) and the mixture was shaken with 200-300 rpm at 0-4° C. After 1-3 hours, the mixture was centrifuged and 6-8 k rpm for 3-10 minutes and the solid product was collected. The solid product was redispersed in 200-700 μL TBS-T buffer (Tween-20 0.05-1%) with the assistance of ultrasonic machine to yield the nanoparticle antibody conjugates. The solution of labelled nanoparticles was stored under 4-8° C. for further use.

Example 13. Preparation of Lateral Flow Test Strip for Detection of IgM and IgG Against 2019-n Con Nucleocapsid Protein Preparation of conjugate pad: Conjugate solution was produced by diluting the labelled nanoparticles with TBS-T buffer (pH 7.4) containing 0.1 mol/L NaCl, 20 mmol/L EDTA, 1% (w/v) BSA, 1% (w/v) sucrose, and 0.02% (w/v) $NaN_3$ to a final concentration of 50 μg/mL. 20 μL conjugate solution was added to a conjugate pad with the size of 3×6 mm which was then dried for 3 hours at 37° C. (ii) Immobilization of capture reagents: 0.1 mg/mL mouse-anti-human IgM-mAB for IgM detection, 0.1 mg/mL mouse-anti-human IgG-mAB for IgG detection and 0.5 mg/mL mouse-anti-nCov-nucleocapsid protein mAB were individually applied on the nitrocellulose membrane as the test line 1, test line 2 and control line respectively. The test and control lines were both set at 4 mm apart from the center of the membrane. The membrane applied with these reagents in the form of dots at 9 μL-1 cm-1 and was dried for 1 hours at 37° C. At last, the membrane was blocked by using 5% (w/v) BSA and was then dried and stored in sealed condition. (iii) Preparation of sample and absorbent pads:
Sample and absorbent pads were made of nonwoven, 100% pure cellulose fiber (Millipore). The 15×300 mm sample pad was saturated with the pH 8.0 buffer containing 0.5% (w/v) BSA, 0.5% (w/v) sucrose, 2 mmol/L sodium borate, and 0.01% (w/v) NaN$_3$, and was then dried for storing. The absorbent pad was cut to size of 40×300 mm. (iv) Assembly of the lateral flow test strip: The sample pad, conjugate pad, NC membrane, and absorbent pad were assembled on the plastic backing support board sequentially with a 2 mm mover lap and covered by color film at both ends. The master card was cut to 3 mm width strips using a CM4000 Cutter (Bio-Dot). The test strips were then sealed in a plastic bag in the form of desiccant gel and stored at 4° C.

Example 14. Procedure for the Detection of IgM and IgG Against 2019-nCov Nucleocapsid Protein Example 11 was used for the testing. Positive serum sample from patient or negative serum sample from normal individual was loaded onto the sample pad of the test strip, and then inserted into the analyzer, which was a photodiode machine, after 10-60 minutes. Ratio of test line intensity was calculated. Table 6 shows the result from positive and negative serum sample.

TABLE 6

| Sample | IgM/IgG ratio |
|---|---|
| Negative serum sample | 0.55 |
| Positive serum sample | 1.44 |

Example 15. Application of AIE Conjugated Antibody in Immunoblotting

Figure 10:
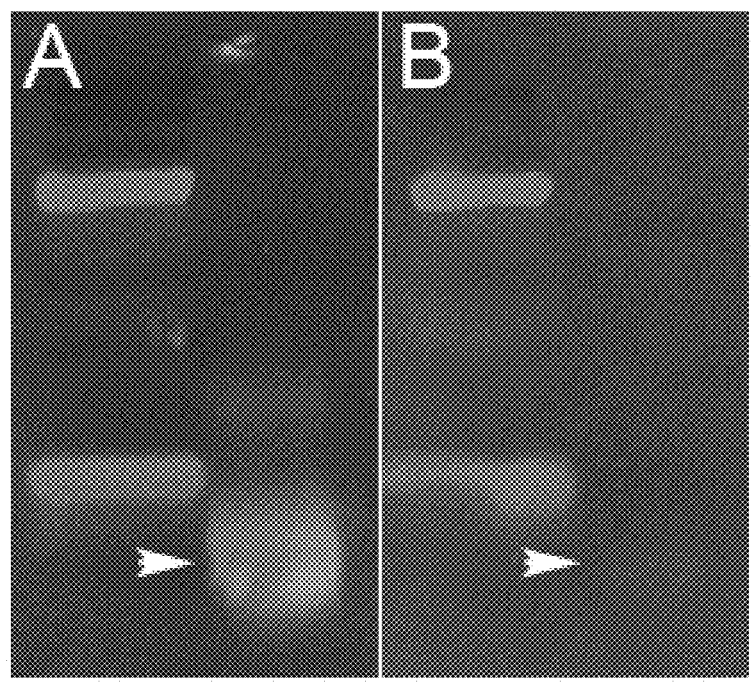
FIG. 10. Performance test on the AIE-conjugated antibody. (A) Direct detection of 7 ng of LH protein on immunoblot using 1:5000 AIE-conjugated mouse anti β-LH antibody (arrow head). (B) Indirect detection of 7 ng of LH protein using 1:5000 unconjugated mouse anti β-LH antibody (arrow head) and 1:5000 FITC conjugated goat anti mouse secondary antibody (arrow head). The images on panel A and B are captured under the same condition.

The AIE-conjugated antibody can enhance the sensitive of immunolabeling. A performance test on the direct immunolabeling using AIE-conjugated antibody to the indirect immunolabeling using traditional fluorophore conjugated (e.g. FITC) antibody was done on immunoblotting. In this test, same amount of proteins was blotted on two nitrocellulose membranes. The protein on one membrane (A) was bound with and detected by AIE-conjugated primary antibody; while the protein on the other membrane (B) was bound with same amount of unconjugated primary antibody and detected by FITC conjugated secondary antibody. Under the same condition, the signal intensity of the target protein detected by direct method using AIE-conjugated antibody on the immunoblot was far stronger than that detected by indirect method using FITC conjugated secondary antibody (FIG. 10).

REFERENCES

[1] S. Thalhammer, E. Linares, *Novel cluster for the detection of an analyte*, 2016, PCT/EP20 15/068 193.
[2] J. S. Lee, S. Lee, M. H. Choi, H. Soo, S. K. Kim, J. Y. Kim, *Enhanced Infrared Ray Absorbing/Emitting Nanoparticles and On-Site Diagnosis Kit Using Same*, 2018, PCT/KR2018/002616.
[3] J. W. Moon, T. J. Phelps, C. L. Fitzgerald, Jr., R. F. Lind, J. G. Elkins, G. G. Jang, P. C. Joshi, M. Kidder, B. L. Armstrong, T. R. Watkins, I. N. Ivanov, D. E. Graham, *Appl Microbiol Biotechnol* 2016, 100, 7921.
[4] S. Wang, N. Mamedova, N. A. Kotov, W. Chen, J. Studer, *Nano Letters* 2002, 2, 817.
[5] W. J. Parak, D. Gerion, T. Pellegrino, D. Zanchet, C. Micheel, S. C. Williams, R. Boudreau, M. A. L. Gros, C. A. Larabell, A. P. Alivisatos, *Nanotechnology* 2003, 14, R15.
[6] G. M. Whitesides, *Nature Biotechnology* 2003, 21, 1161.
[7] A. Care, N. Sayyadi, R. Connally, A. Try, P. L. Bergquist, A. Sunna, *Luminescent biomolecular complex and use thereof*, 2016, PCT/AU2016/000263.
[8] J. Luo, Z. Xie, J. W. Y. Lam, L. Cheng, B. Z. Tang, H. Chen, C. Qiu, H. S. Kwok, X. Zhan, Y. Liu, D. Zhu, *Chemical Communications* 2001, 1740.

The invention claimed is:

1. A method of producing nanoparticles having a solid state luminescence quantum yield higher than 20%, the method comprising:
   a. forming a first solution having a luminophore concentration between 1 and 500 grams of luminophores per liter of the first solution by dissolving a first amount of luminophores in a second amount of one or more monomers;
   b. forming a second solution by dissolving a third amount of an initiator in a fourth amount of deionized water;
   c. forming a third solution by dissolving a fifth amount of a surfactant in a sixth amount of deionized water;
   d. forming a fourth solution by adding the first solution and the second solution to the third solution; and
   e. producing nanoparticles having the solid state luminescence quantum yield higher than 20% by heating the the fourth solution until the fourth solution is translucent white.

2. The method of claim 1 wherein said second portion is greater or equal to 1% and less than 99% of said first solution by volume.

3. The method of claim 1, wherein said first solution and said second solution are added simultaneously to said the third solution.

4. The method of claim 1 wherein said luminophores include a luminophore including N-5-nitrosalicylidene-4-tetraphenvlethenylamine.

5. The method of claim 1 wherein said luminophores comprise a fluorogen comprising one or more chemical formulas including a backbone represented by:

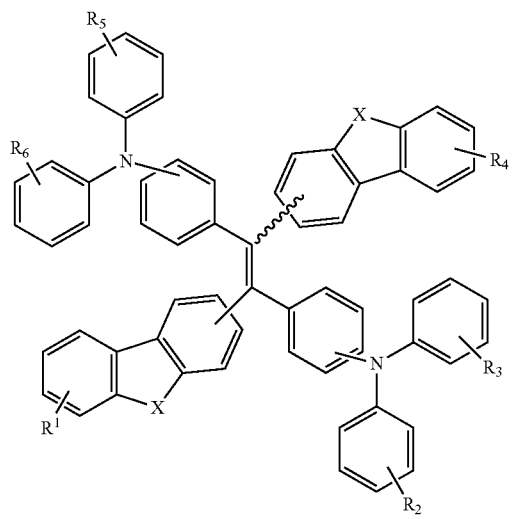

wherein each of $R_1$, $R_2$, $R_3$, $R_4$, $R_5$, and $R_6$ is independently selected from the group consisting of H, alkyl, unsaturated alkyl, heteroalkyl, cycloalkyl, heterocycloalkyl, aryl, and heteroaryl; and wherein each X is independently selected from oxygen, sulfur, selenium, tellurium, carbon, silicon, germanium, phosphorus, arsenic, and antimony hydrogen, alkyl, unsaturated alkyl, heteroalkyl, cvcloalky, heterocycloalkyl, aryl, and heteroaryl.

6. The method of claim 1 wherein said one or more monomers are selected from the group consisting of styrene, methyl methacrylate, acrylic acid, vinyl acetate, and ethylene glycol.

7. The method of claim 1, wherein said initiator is selected from the group consisting of ammonium persulfate; 2,2'-azobis (isobutyronitrile); benzoyl peroxide; potassium persulfate; and 4, 4'-azobis (4-cyanovaleric acid).

8. The method of claim 1 wherein said initiator in said second solution is at a concentration between 0.1% and 1% mass/volume.

9. The method of claim 1 wherein said surfactant is selected from the group consisting of sodium decylbenzenesulfonate, sodium dodecyl sulfate, docusate sodium, perfluorooctanesulfonic acid, perfluorobutanesulfonic acid, sodium stearate, quaternary ammonium cation, alkyl polyglycoside, glycerol monostearate and nonylphenoxypolyethoxylethanol.

10. The method of claim 1 wherein said surfactant in said third solution is at a concentration between 3 and 12 grams of surfactant per liter of the third solution.

11. The method of claim 1 wherein said heating is to a temperature between 70° C. to 90° C.

12. A method of producing nanoparticles having a solid state luminescence quantum yield higher than 20%, the method comprising:
   a. forming a first solution having a luminophore concentration between 1 and 500 gram of luminophores per liter of the first solution by dissolving a first amount of luminophores in a second amount of a monomer solution by adding the first amount of the luminophores to the second amount of the monomer solution;
   b. dividing the first solution into a first portion and a second portion;
   c. forming a second solution by dissolving a third amount of an initiator in a fourth amount of a deionized water by adding the third amount of the initiator in the fourth amount of the deionized water;
   d. dividing the second solution into a third portion and fourth portion;
   e. forming a third solution by dissolving a fifth amount of a surfactant in a sixth amount of the deionized water by adding the fifth amount of the surfactant in the sixth amount of the deionized water;
   f. dividing the third solution into a fifth portion and a sixth portion;
   g. forming a fourth solution by adding the first portion of the first solution and the third portion of the second solution to the fifth portion of the third solution; and
   h. producing a first plurality of nanoparticles having a first solid state luminescence quantum yield higher than 20% by heating the fourth solution until the fourth solution is translucent white;
   i. forming a fifth solution by adding the second portion of the first solution and the fourth portion of the second solution to the sixth portion of the third solution;
   j. stirring the fifth solution at a mechanical stirring speed having between 10 rotations per minute and 2000 rotations per minutes; and
   l. producing a second plurality nanoparticles having a second solid state luminescence quantum yield higher than 20% by heating the fifth solution until the fifth solution is translucent white.

13. A method of producing nanoparticles having a solid state luminescence quantum yield higher than 20%, the method comprising:
   a. forming a first solution having a luminophore concentration between 1 and 500 grams of luminophores per liter of the first solution by dissolving a first amount of luminophores in a second amount of a monomer solution by adding the first amount of the luminophores to the second amount of the monomer solution;
   b. dividing the first solution into a first portion and a second portion;
   c. forming a second solution by dissolving a third amount of an initiator in a fourth amount of a deionized water;
   d. dividing the second solution into a third portion and fourth portion;
   e. forming a third solution by dissolving a fifth amount of a surfactant in a sixth amount of the deionized water by adding the fifth amount of the surfactant in the sixth amount of the deionized water;
   f. dividing the third solution into a fifth portion and a sixth portion;
   g. forming a fourth solution by adding the first portion of the first solution and the third portion of the second solution to the fifth portion of the third solution;
   h. producing a first plurality of nanoparticles having a first solid state luminescence quantum yield higher than 20% by heating the fourth solution until the fourth solution is translucent white;
   i. forming a fifth solution by adding the second portion of the first solution and the fourth portion of the second solution to the sixth portion of the third solution
   j. performing an ultrasonic treatment to the fifth solution, the ultrasonic treatment having a power between 400 watts and 2000 watts of ultrasonic treatment; and
   l. producing a second plurality nanoparticles having a second solid state luminescence quantum yield higher than 20% by heating the fifth solution until the fifth solution is translucent white.

14. The method of claim 1 further comprising stirring the fourth solution at a mechanical stirring speed having between 10 rotations per minute and 1000 rotations per minute before step (e).

15. The method of claim 1 further comprising performing an ultrasonic treatment on the third solution before step (e), the ultrasonic treatment having a power between 400 watts and 2000 watts of ultrasonic treatment.

16. A method of producing nanoparticles having a solid state luminescence quantum yield higher than 20%, the method comprising:
   a. forming a first solution having a luminophore concentration between 1 and 500 grams of luminophores per liter of the first solution by dissolving a first amount of luminophores in a second amount of one or more monomers;
   b. dividing the first solution into a first portion and a second portion;
   c. forming a second solution by dissolving a third amount of an initiator in a fourth amount of deionized water;
   d. forming a third solution by dissolving a fifth amount of a surfactant in a sixth amount of deionized water;
   e. forming a fourth solution by adding the first portion of the first solution to the third solution and stirring the fourth solution at a mechanical stirring speed having between 10 rotations per minute and 1000 rotations per minute;

f. forming a fifth solution by adding the second portion of the first solution and the second solution to the fourth solution; and g. producing nanoparticles having the solid state luminescence quantum yield higher than 20% by heating the fifth solution until the fifth solution is translucent white.

17. The method of claim 16 wherein said first portion is greater or equal to 1% and less than 99% of said first solution by volume.

18. The method of claim 16 further comprising performing an ultrasonic treatment on the third solution before step (e), the ultrasonic treatment having a power between 400 watts and 2000 watts of ultrasonic treatment.

* * * * *